Jan. 20, 1970        H. ENGELHARDT        3,490,284

FLOWMETER WITH REMOVABLE MEASURING TUBE

Filed June 20, 1967        2 Sheets-Sheet 1

INVENTOR
HELMUT ENGELHARDT

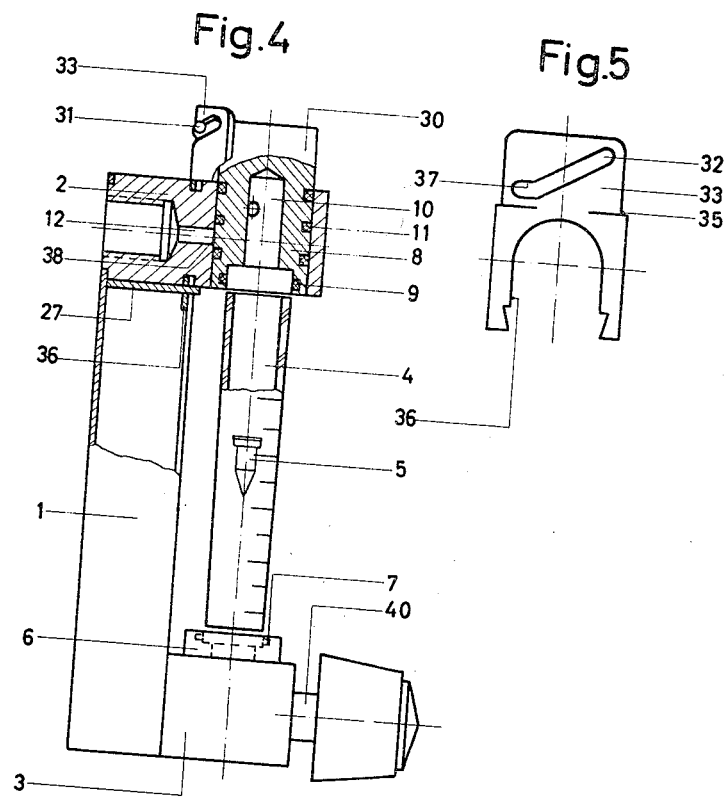

United States Patent Office 3,490,284
Patented Jan. 20, 1970

3,490,284
FLOWMETER WITH REMOVABLE MEASURING TUBE
Helmut Engelhardt, Duisburg, Germany, assignor to Fa. Rheometron G.m.b.H., Basel, Switzerland
Filed June 20, 1967, Ser. No. 647,444
Claims priority, application Germany, June 22, 1966, R 43,519
Int. Cl. G01f 1/02
U.S. Cl. 73—209      10 Claims

ABSTRACT OF THE DISCLOSURE

A flowmeter formed by a measuring tube positioned between a movable support member and a stationary support member. The support members are mounted in brackets on a frame. A plate having a slotted opening is secured to the bracket supporting the movable support member. A pin attached to the movable support member extends through a slot in the plate. A removable handle is secured to the movable support member for rotating and axially displacing the member which is guided by the pin located in the slot. When the movable support member is displaced, the measuring tube can be removed laterally without any angular displacement from its position between the support members.

BRIEF SUMMARY OF THE INVENTION

The present invention is directed to flowmeters and, more particularly, to a meter construction where the measuring tube can be removed without any angular displacement of the tube from its position in the support frame.

In flowmeters the measuring tube is normally positioned between a pair of bracket-like supports which hold it in position. When it is necessary to change the measuring tube in such meters, the brackets have been constructed so that they have to be resiliently displaced for removing the measuring tube. In flowmeters of this type the measuring tube is pushed upwardly or downwardly against the resilient force of the brackets and then is moved angularly from the axial direction of the tube in the flowmeter so that it can be removed from between the supports. When a measuring tube is replaced, the same operation takes place in reverse.

When a measuring tube is forced against a resiliently mounted support during removal and insertion, particularly if a glass tube is used, there is a strong possibility of breakage of the tube. Because of the resilient force which must be overcome, it is often difficult to remove and replace measuring tubes and in some instances it is dangerous because of the breakage of the glass. In addition, the material which provides the fluid-tight seal between the tube and its supports is exposed to considerable stress and strain in the removal and reinsertion operation and quickly loses its effectiveness.

When the fluid passing through the flowmeter is at a relatively high pressure, the resiliently mounted support has to possess a similarly high spring tension and under such conditions the disadvantages mentioned above become aggravated.

In the present invention the disadvantages noted above are eliminated and it is possible to remove and replace the measuring tube without any danger of breakage or damage to the seals in the supports. Further in the present arrangement the measuring tube may be removed laterally without being angularly displaced from its position or orientation between the supports. Since there is no interfering structure, the tube does not have to be manipulated in various directions to achieve its removal. Normally, it is this manipulation which results in the damage to the measuring tube and to the remaining structure of the flowmeter. In the present arrangement the brackets carrying the measuring tube supports are spaced apart at least a distance equal to the height of the measuring tube, this permits the tube to be removed laterally without being turned or displaced angularly from its support position.

In the flowmeter of the present invention at least one of the measuring tube supports is axially displaceable between its operating position where it holds the measuring tube in fluid-tight engagement and its tube removal position. Generally, the movable support is located at the upper end of the flowmeter. With the support in its tube removal position, the measuring tube can be removed laterally without being tilted or deflected from its upright position. For displacing the movable support, a handle is secured to it so that it can be shifted manually between the operating and tube removal positions. The handle is easily accessible from the exterior of the flowmeter and, preferably, can be removed during operation or use of the meter to prevent accidental displacement of the support.

Another feature of the present arrangement is a locking means for holding the support in its engaged position on the measuring tube. Various means can be used for accomplishing this end such as bolts, safety bolts, or various slotted engagements.

The combination of the above features provides a measuring tube which in its operating position is secured in fluid-tight engagement and in its removal position can be slipped laterally out of the meter without being tilted, forced or jammed. When the support is moved into its tube removal position, there is not other structure interfering with the lateral removal of the tube from the flowmeter. If during the insertion of a measuring tube it should become jammed or stuck between its supports, it can be easily released by axially displacing the movable support. Since there is no need for tilting the tube to its normal position in the meter during removal, the possibility of damage from such movement is avoided. However, it will be appreciated that it is possible to incline the tube obliquely for purposes of seating or otherwise securing it in place. Further, since there is no interfering structure, once the movable support has been axially displaced from its operating position, any oblique movement of the tube is not likely to cause it any damage. Similarly, the insertion of a new measuring tube can be easily performed.

As a result, the present invention combines easy removal and insertion or reinsertion of measuring tubes between the supports with the elimination of the possibility of breakage, this being particularly advantageous where glass tubes are used.

Accordingly it is a primary object of the invention to provide a support arrangement for a measuring tube in the flowmeter where at least one of the support members is axially displaceable from the end of the measuring tube.

Another object of the invention is to afford a guide means for maintaining the movable support in its axial alignment while permitting it to be moved from the end of the measuring tube.

Still another object of the present invention is to provide a locking arrangement for the movable support whereby it is positively held in position during the use of the flowmeter.

Yet, another object of the invention is to utilize a removable handle for moving the support member between its operating and its tube removal positions whereby the support member cannot be accidentally displaced during operation.

Moreover, another object of the invention is to provide a flowmeter structure from which the measuring tube can be removed laterally without having to be tilted.

A further object of the invention is to provide a removal arrangement which overcomes the disadvantages of the prior art and supplies an arrangement wherein the possibility of breakage of the measuring tube, particularly where glass tubes are used, is avoided.

Therefore, the present invention provides a flowmeter comprising a frame supporting a pair of spaced brackets. Each of the brackets carries a support member for a measuring tube and the support members have sealing means to assure that there is no loss of fluid when the measuring tube is held securely in its operating position. At least one of the support members is mounted in the frame so that it can be axially displaced from the measuring tube for the easy removal of the tube. When the movable support is in its operating position at the end of the measuring tube it is securely locked in place so that no displacement can occur. As an added safety feature, the handle for shifting the support member from its operating to its tube removal position, is removable during the use of the flowmeter so that the possibility of accidental displacement is avoided.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 4 is a side view, similar to FIG. 1, however with a portion of the apparatus shown in a displaced position; and FIG. 5 is a detail view of a portion of the apparatus shown in FIGS. 1 to 4.

DETAILED DESCRIPTION

Figure 1:
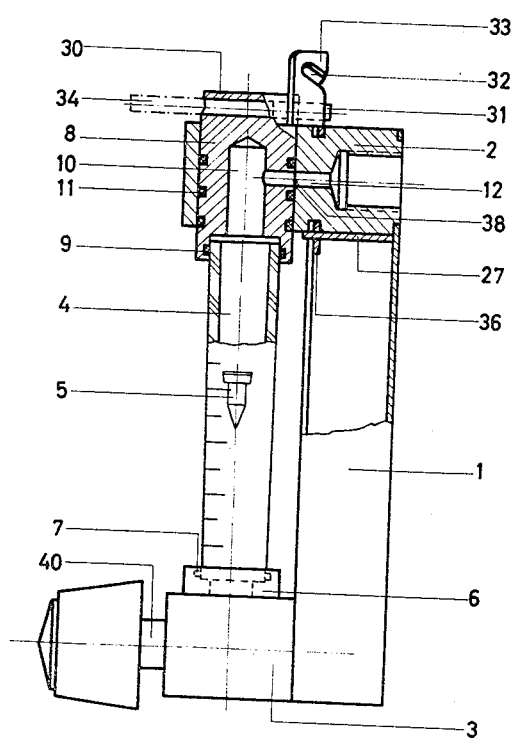
FIG. 1 is a side view, partly in section, of a preferred embodiment of the present invention.

The flowmeter consists of a vertically arranged frame 1 having an upper bracket 2 and a lower bracket 3 attached to the frame. Positioned in the flow meter between the upper and lower brackets is a cylindrically shaped glass tube 4, in some instances the glass tube may have a conical shape. On its outer surface the measuring tube is provided with a scale and a floating element 5 is situated within the tube. The height of the floating element in the tube is a measure of the flow speed or flow quantity of the liquid or gas being measured by the meter.

At its lower end within bracket 3 the glass tube 4 is held by a support member 6 with sealing means 7 located at the joint between the glass tube and the support member. In the arrangement shown in the drawings, the lower support member 6 is fixed in place.

At its upper end the glass tube 4 is secured within a movable support member 8 provided with sealing means 9 to prevent the loss of fluid between the glass tube and the support 8. The support member 8 is axially displaceable upward from the end of the measuring tube and as it rides upwardly, it rotates about its own axis. A bore 10 within the support member 8 provides an axial extension of the passageway through the measuring tube and an additional transverse bore 12 provides a flow passage from the support member into its corresponding bracket 2.

Figure 2:
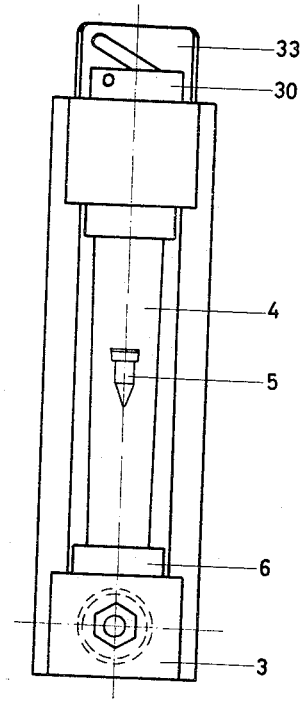
FIG. 2 is a front view of the arrangement as shown in FIG. 1.
Figure 3:
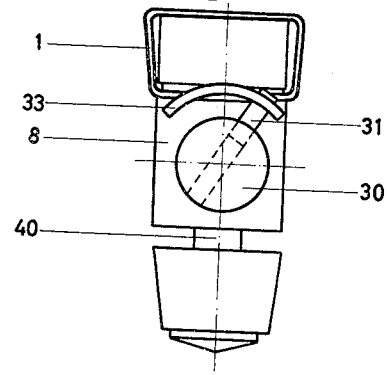
FIG. 3 is a top view of the arrangement shown in FIG. 1.

Secured to and extending above the bracket 2 is a curved plate member 33. As can be seen in FIG. 5, the lower portion 36 of the plate member 33 is shaped to fit over the bracket 2 and is attached to it by means of a locking plate 27. The plate member 33 forms a part of a circle and curves about the upper end of the support member 8. A curved slot 32 (see FIGS. 2 and 4) is formed in the plate member and is disposed at an angle to a horizontal plane passing through the axis of the measuring tube. As viewed in FIG. 5, the slot 32 extends upwardly from left to right and at its lower end a horizontally arranged extension of the slot 32 provides a locking groove 37.

In FIG. 1 the movable support member 8 is in its operating position secured in sealed engagement on the end of the measuring tube 4 and in FIG. 4 the support member 8 is shown in its disengaged or tube removal position. At its upper end the support member 8 has a part 30 which extends above the bracket 3. A bolt or pin 31 extends from the part 30 into the slot 32 in the plate 33. The slot acts as a guide for the pin 31, by rotating the support member the pin 31 is released from the locking groove 37 and rides in an upwardly sloping direction as the member is lifted from the upper end of the measuring tube 4.

A handle 34, see FIG. 1, is secured to the part 30 of the support member 8 and provides the means for manually rotating the support member from its operating position to its tube removal position. Preferably, the handle 34 is removable when not in use. This arrangement assures that the handle will not be hit or moved accidentally during operation of the flowmeter, thereby releasing the upper movable support from the tube and permitting the fluid flowing through the tube to escape.

In FIG. 4 the support member 8 is shown lifted from the end of the measuring tube 4. In this arrangement, the measuring tube 4 can be lifted slightly so that it clears the support member 6 at its lower end and then can be moved laterally away from the flowmeter. It will be noted that the measuring tube is of a length less than the distance between the upper and lower brackets 2 and 3. When the tube is being removed, it is only necessary, as mentioned, to lift it slightly to clear the lower support 6 and then it can be moved laterally in a position parallel to its operating position in the flowmeter. In the prior art the tube had to be forced against the resilient action of its support before it could be removed and it was necessary to tilt or angularly dispose the tube from its operating position within the flowmeter. This is not the case in the present arrangement since the tube can easily clear the remaining structure of the flowmeter and does not have to be tilted or otherwise manipulated in removal.

With the old tube removed, a new one is easily inserted by reversing the steps of the removal operation and the handle 34 is moved downwardly again until the pin 31 is engaged within the groove section 37 locking the support member 8 securely in place on the end of the new measuring tube and providing the sealed engagement between the means 9 and the end of the tube 4. With this simple insertion operation completed, the flowmeter is again ready to be placed in operation.

The plate member 33 can be made of a sheet metal strip 35. The lower portion of the strip 36 fits over the upper bracket 2 and is held in position by the locking member 27. The slot in the upper portion of the plate member 33 is curved according to the rotational arc of the pin 31 extending from the upper part 30 of the support member 8. As noted, the lower end of the slot 32 has a horizontally arranged locking groove into which the pin 31 is engaged so that the support member 8 is held securely in place on the upper end of the measuring tube 4. While the locking groove 37 in the slot 32 is shown horizontally arranged, it will also be possible to arrange it in a slightly upwardly sloping manner as long as sufficient locking and sealing engagement is provided for the end of the measuring tube 4.

If the extent of the rotation of the support member 8 is sufficient, the member may also act as a valve so that, as it is lifted and rotated, the connection 38, see FIGS. 1 and 4, is closed by the wall of the support member 8. It will be noted in FIG. 1 that the passage 38 between the bores 10 and 12 is opened, and in FIG. 4 when the support member is moved to its upper position, the connection 38 is closed avoiding any back flow into the passage 10. In the lower bracket 3 the flow of fluid into the meter is regulated by a valve whose control handle 40 is shown in the drawings.

It will be appreciated that the arrangement shown in the drawings is by way of example and does not exclude a number of variations in the arrangement of the different parts which make up the flowmeter. In particular, the movable support member could be arranged at the lower rather than at the upper end of the frame. With the movable support member located at the lower end, the handle would shift it downwardly and the tube could be removed in the same fashion as described above. It might also be possible to have both the support members movable, depending on the particular construction desired, to assure ample room for removing the measuring tube without displacing it from its upright position in the frame.

In view of the flowmeter construction described it can be appreciated how easily and simply the measuring tube can be removed from the frame of the flowmeter without any pressure or force being exerted on it. Since there is ample clear space between the brackets, the measuring tube can be moved laterally without fear that it will be damaged in striking against some obstructing member of the flowmeter structure.

While a specific embodiment of the invention has been shown and described in detail to illustrate the application of the inventive principles, it will be understood that the invention may be embodied otherwise without departing from such principles.

What is claimed is:

1. A flowmeter comprising an elongated frame having a pair of mounting sections thereon spaced apart along the longitudinal direction of said frame, a pair of support members positioned on said frame in axially aligned spaced relationship with one of said support members being axially movably positioned within one of said mounting sections and the other said support member being located within the other said mounting section, a measuring tube arranged to extend between and in coaxial relationship with said support members with its ends being held in fluid-tight engagement with said support members in operating position of the flowmeter, said one of said support members being axially movable within said mounting section between the operating position and a second position spaced further away from the operating position, said one of said support members having a passageway therethrough arranged in communication with said measuring tube in the operating position, said one of said mounting sections comprising a bracket mounted at one end of said frame, said bracket having an opening therethrough to hold said one of said support members and a plate member secured to said bracket and coupled to said support member by said means for interconnecting said support member and said mounting means, said one of said mounting means having a passageway therethrough in communication with the passageway through said one of said support members when said support member is in operating position and not being in communication with the passageway in said support member when said support member is moved to its second position means for interconnecting said one of said support members and its corresponding said mounting section for guiding said support member in its movement between the operating and second positions and for locking said support member in its operating position against displacement due to axial forces and lifting means attached to one of said support members for displacing said one of said support members from its locked engagement in the operation position and for lifting said support member from its operating position to its second position, whereby in the second position said tube can be removed laterally from the flowmeter without any appreciable angular displacement of said tube from the axial direction between said support members and without applying force to said tube for displacing said support members axially to effect its removal.

2. A flowmeter as set forth in claim 1, wherein a valve is positioned in the other said support member for regulating the flow of fluid into said measuring tube.

3. A flowmeter, as set forth in claim 1, wherein said plate member has a slot formed therein, said means for interconnecting said one of said support members and said mounting section comprising a pin member secured to said one of said support members and extending into the slot in said plate member for slidable movement therethrough in guiding said one of said support members between the operating position and the second position.

4. A flowmeter as set forth in claim 3, wherein said lifting means comprises a handle removably attached to said one of said support members for moving said support member between its operating and second positions.

5. A flowmeter as set forth in claim 3, wherein the slot in said plate means is disposed at an oblique angle to a plane arranged perpendicularly to the axis of said measuring tube.

6. A flowmeter as set forth in claim 5, wherein said measuring tube is positioned vertically and said movable support member is disposed at the upper end of said frame.

7. A flowmeter as set forth in claim 6, wherein means are provided in said support members for forming a fluid-tight seal between the walls of said tube and said support members.

8. A flowmeter as set forth in claim 7, wherein the spacing between said brackets on said frame is at least equal to the axial length of the measuring tube positioned between said support members.

9. A flowmeter as set forth in claim 5, wherein said slot has an extension at one end angularly disposed from the axis of the slot for forming a locking groove for said pin.

10. A flowmeter as set forth in claim 9, wherein a float member is positioned within said measuring tube for indicating the specific characteristic of the fluid passing through the tube, said tube having a scale formed on its surface for indicating the flow characteristic of the fluid passing through the tube.

References Cited

UNITED STATES PATENTS

| | | | |
|---|---|---|---|
| 2,370,634 | 3/1945 | Brewer | 73—209 |
| 2,755,659 | 7/1956 | Boppel | 73—209 X |
| 3,232,107 | 2/1966 | Busillo | 73—209 |

RICHARD C. QUEISSER, Primary Examiner

JOHN K. LUNSFORD, Assistant Examiner